United States Patent
Chen et al.

(10) Patent No.: US 11,990,100 B2
(45) Date of Patent: May 21, 2024

(54) E-PAPER IDENTIFICATION CARD SYSTEM AND E-PAPER IDENTIFICATION CARD

(71) Applicant: E Ink Holdings Inc., Hsinchu (TW)

(72) Inventors: Chih-Chun Chen, Hsinchu (TW);
Huei-Chuan Lee, Hsinchu (TW);
Cheng-Hsien Lin, Hsinchu (TW);
Shuo-En Lee, Hsinchu (TW); Kai-Yi Cho, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 18/153,363

(22) Filed: Jan. 12, 2023

(65) Prior Publication Data

US 2023/0274713 A1 Aug. 31, 2023

(30) Foreign Application Priority Data

Feb. 25, 2022 (TW) .................................. 111106925

(51) Int. Cl.
*G09G 3/34* (2006.01)
(52) U.S. Cl.
CPC .................................. *G09G 3/344* (2013.01)
(58) Field of Classification Search
None
See application file for complete search history.

(56) References Cited

U.S. PATENT DOCUMENTS

| | | | |
|---|---|---|---|
| 10,339,351 B2 | 7/2019 | Sweeney et al. | |
| 10,867,144 B2 | 12/2020 | Sweeney et al. | |
| 2008/0240702 A1* | 10/2008 | Wassingbo | H04N 1/00307 396/429 |
| 2009/0189848 A1* | 7/2009 | Maeda | G09G 3/344 345/107 |
| 2012/0181333 A1 | 7/2012 | Krawczewicz et al. | |
| 2015/0134687 A1 | 5/2015 | Sohn et al. | |
| 2021/0374715 A1* | 12/2021 | Bergeron | G06K 19/07769 |

FOREIGN PATENT DOCUMENTS

| | | |
|---|---|---|
| CN | 101351737 | 12/2011 |
| TW | M610088 | 4/2021 |

OTHER PUBLICATIONS

Bergells, Laura; Get a QR code of your LinkedIn Profile; Youtube; https://www.youtube.com/watch?v=ZhYcT5ZCQmU; Oct. 26, 2019 (Year: 2019).*

* cited by examiner

*Primary Examiner* — Matthew Yeung
(74) *Attorney, Agent, or Firm* — JCIPRNET

(57) ABSTRACT

An e-paper identification card system including an e-paper identification card and a data updating apparatus is provided. The e-paper identification card is configured to display first image information. The data updating apparatus is electrically connected to the e-paper identification card. The data updating apparatus is configured to update the e-paper identification card according to the first image information to drive the e-paper identification card to display second image information. In addition, an e-paper identification card is also provided.

7 Claims, 3 Drawing Sheets

US 11,990,100 B2

E-PAPER IDENTIFICATION CARD SYSTEM AND E-PAPER IDENTIFICATION CARD

CROSS-REFERENCE TO RELATED APPLICATION

This application claims the priority benefit of Taiwan application serial no. 111106925, filed on Feb. 25, 2022. The entirety of the above-mentioned patent application is hereby incorporated by reference herein and made a part of this specification.

BACKGROUND

Technical Field

The disclosure relates to an identification card system and an identification card, and in particular relates to an e-paper identification card system and an e-paper identification card.

Description of Related Art

Most of the current visitor identification cards are for one-time use, or does not display personal information on the surface. One-time use visitor identification cards result in a waste of resources, and the visitor identification cards that do not display personal information may lead to user identity theft.

SUMMARY

The disclosure provides an e-paper identification card system and an e-paper identification card, which may instantly identify a user's identity, and prevent user identity theft. In addition, the e-paper identification card may be reused.

The e-paper identification card system of the disclosure includes an e-paper identification card and a data updating apparatus. The e-paper identification card is configured to display first image information. The data updating apparatus is electrically connected to the e-paper identification card. The data updating apparatus is configured to update the e-paper identification card according to the first image information, so that the e-paper identification card displays second image information. The data updating apparatus includes an image capturing device. The image capturing device is configured to capture a user image. The second image information includes the user image.

In an embodiment of the disclosure, the image capturing device is configured to capture the first image information from the e-paper identification card.

In an embodiment of the disclosure, the data updating apparatus obtains user data from a database according to the first image information. The second image information includes the user data.

In an embodiment of the disclosure, the data updating apparatus includes a user interface. The user interface is configured to be operated to update display information of the e-paper identification card.

In an embodiment of the disclosure, the e-paper identification card includes an e-paper driving circuit and an e-paper display panel. The data updating apparatus transmits the second image information to the e-paper driving circuit. The e-paper driving circuit drives the e-paper display panel to display the second image information.

The e-paper identification card of the disclosure includes an e-paper display panel and an e-paper driving circuit. The e-paper display panel is configured to display first image information. The e-paper driving circuit is electrically connected to the e-paper display panel. The e-paper driving circuit is configured to receive second image information and to drive the e-paper display panel to display the second image information. The first image information corresponds to user data. The second image information includes the user data. The second image information includes a user image. The e-paper driving circuit receives the second image information from the data updating apparatus. The data updating apparatus is configured to capture the user image.

In an embodiment of the disclosure, the e-paper driving circuit receives the second image information from a data updating apparatus. The data updating apparatus is configured to capture the first image information from the e-paper display panel and to obtain the user data from a database according to the first image information.

In order to make the aforementioned features and advantages of the disclosure comprehensible, embodiments accompanied with drawings are described in detail below.

DETAILED DESCRIPTION OF DISCLOSED EMBODIMENTS

Figure 1:
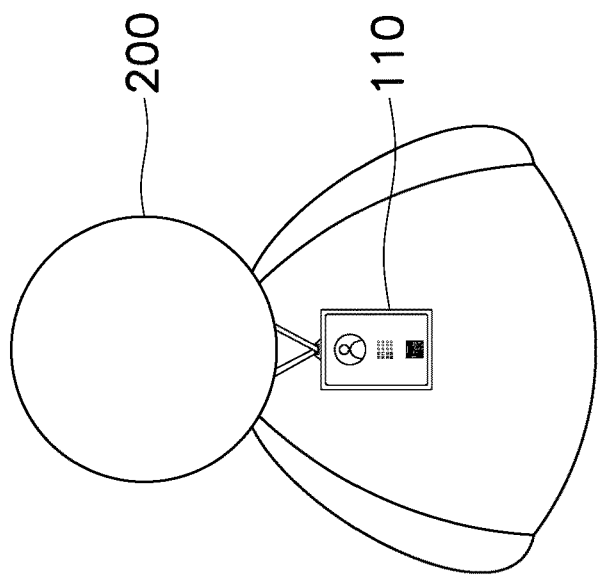
FIG. 1 illustrates an outline schematic diagram of an e-paper identification card system according to an embodiment of the disclosure.
Figure 1:
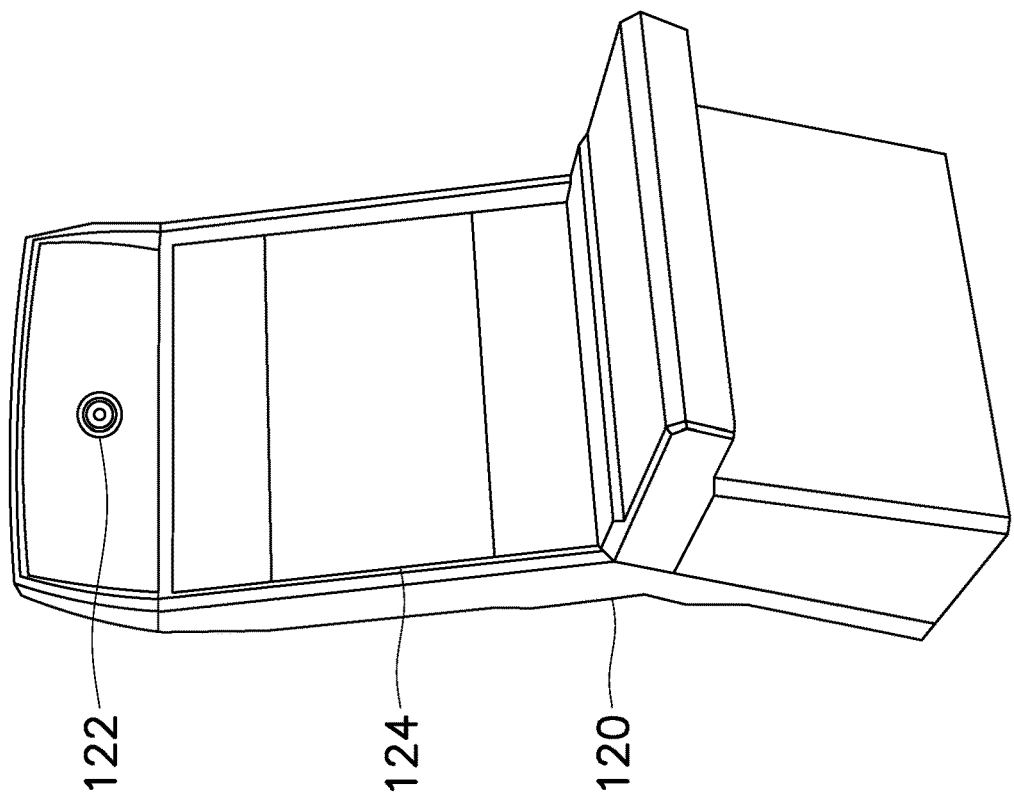
Figure 2:
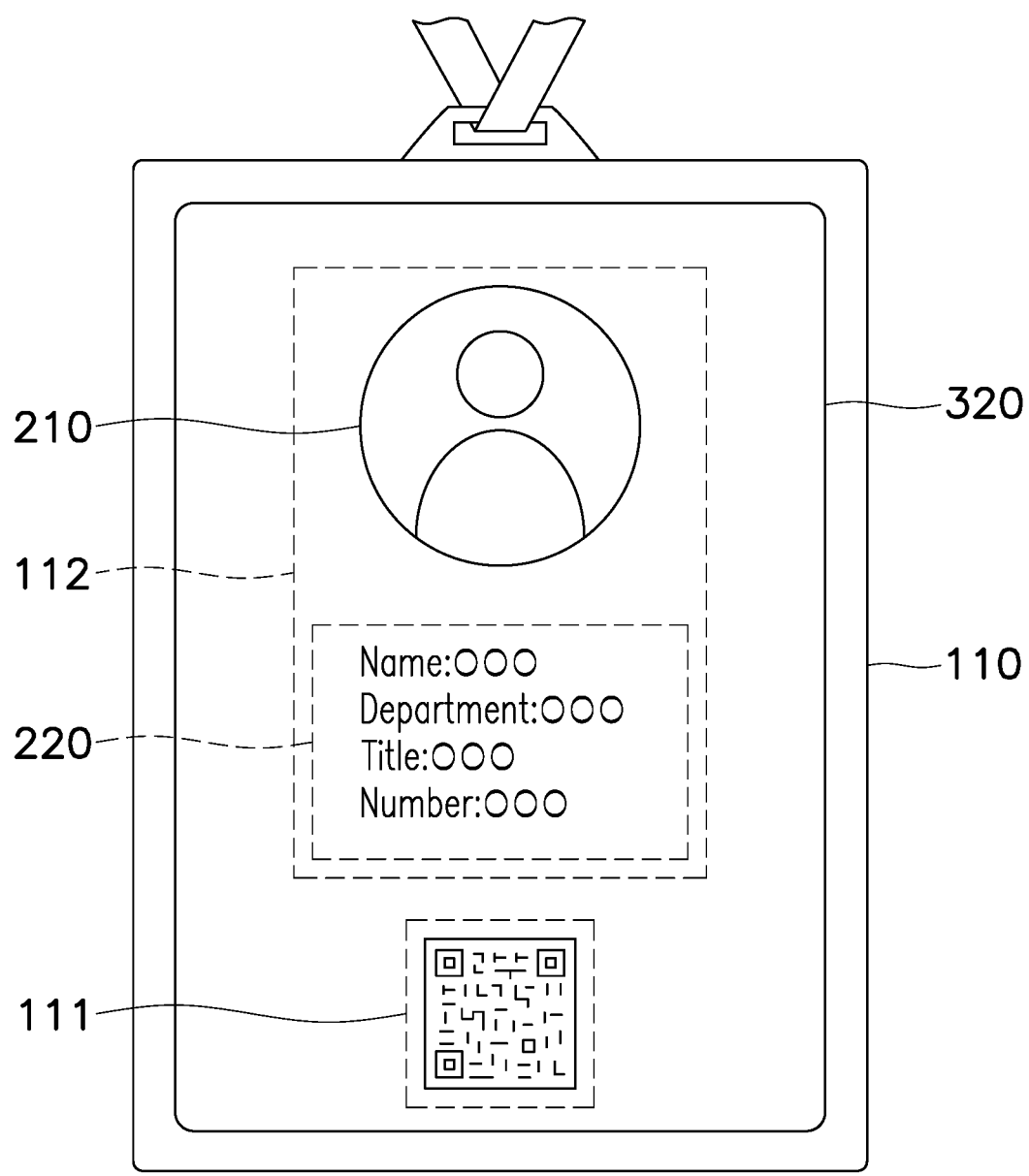
FIG. 2 illustrates an outline schematic diagram of the e-paper identification card of the embodiment of FIG. 1.

FIG. 1 illustrates an outline schematic diagram of an e-paper identification card system according to an embodiment of the disclosure. FIG. 2 illustrates an outline schematic diagram of the e-paper identification card of the embodiment of FIG. 1. Referring to FIG. 1 and FIG. 2, the e-paper identification card system 100 of this embodiment includes an e-paper identification card 110 and a data updating apparatus 120. The e-paper identification card 110 is configured to display first image information 111. The data updating apparatus 120 is electrically connected to the e-paper identification card 110. The data updating apparatus 120 is configured to update the e-paper identification card 120 according to the first image information 111, so that the e-paper identification card 110 displays second image information 112.

In this embodiment, the first image information 111 is, for example, a two-dimensional code or other image information that may be recognized by the data updating apparatus 120, and the disclosure does not limit the form of the first image information. The second image information 112 includes a user image 210 and user data 220.

Specifically, the data updating apparatus 120 includes an image capturing device 122 and a user interface 124. The image capturing device 122 is, for example, a camera, which is configured to capture the user image 210 of a user 200, and may also be configured to capture the first image information 111 to be recognized by the data updating apparatus 120. Therefore, the data updating apparatus 120 may obtain the user data 220 from the database (not shown) according to the first image information 111. The database may be built within the data updating apparatus 120, or the database may be a cloud database built outside the data updating apparatus 120, and the disclosure does not limit the form of the database. The user 200 may operate the user interface 124 to update the display information of the e-paper identification card 110, such as the second image information 112. That is, the user interface 124 may be operated to update the display information of the e-paper identification card 110.

In this embodiment, the user 200 is, for example, a visitor. Before the visitor comes to visit, the relevant personnel (for example, the visitor or the interviewee) logs the user data 220 into the database. The login method may utilize an online system, and the disclosure does not limit the form of the login method. The e-paper identification card system 100 cooperates with the database to obtain the user data 220. The user data 220 has corresponding first image information 111. Before the user 200 receives the e-paper identification card 110, the e-paper identification card 110 first displays the first image information 111 corresponding to the user data 220. Next, the user 200 receives the e-paper identification card 110 and brings the e-paper identification card 110 in front of the data updating apparatus 120. The user 200 scans the first image information 111 and takes a photo. Then, the e-paper identification card 110 is placed in the data updating apparatus 120, and a data updating operation is performed on the data updating apparatus 120. After the operation is completed, the e-paper identification card 110 displays the user image 210 (i.e., a profile photo of the visitor) and the corresponding user data 220 (i.e., the second image information 112). The user data 220 includes, for example, customized information such as the visitor's name, the visitor's company, and the visiting sector. Therefore, the e-paper identification card system 100 and the e-paper identification card 110 of this embodiment may identify the identity of the user 200 in real time, thereby preventing user identity theft of the user 200.

In one embodiment, the e-paper identification card 110 may also integrate a radio frequency identification function, wherein a radio frequency tag with the user data 220 is attached to the e-paper identification card 110, and the radio frequency identification function is configured on the data updating apparatus 120, so that the user identity theft of the user 200 may be further prevented.

Figure 3:
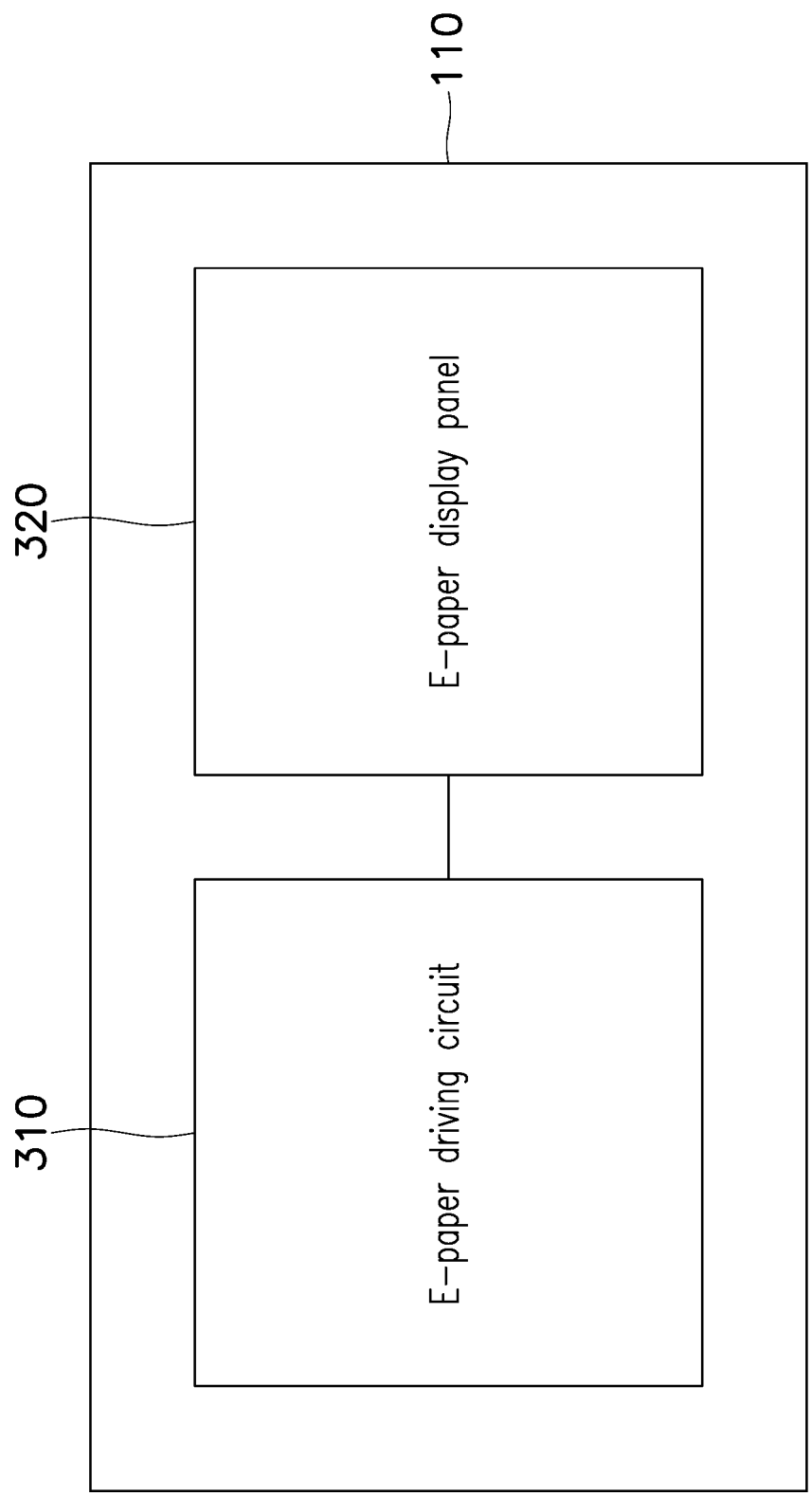
FIG. 3 illustrates a block schematic diagram of an e-paper identification card according to an embodiment of the disclosure.

FIG. 3 illustrates a block schematic diagram of an e-paper identification card according to an embodiment of the disclosure. Referring to FIG. 2 and FIG. 3, the e-paper identification card 110 includes an e-paper driving circuit 310 and an e-paper display panel 320. The e-paper display panel 320 is configured to display the first image information 111. The e-paper driving circuit 310 is electrically connected to the e-paper display panel 320. The e-paper driving circuit 310 is configured to receive the second image information 112 and to drive the e-paper display panel 320 to display the second image information 112. The first image information 111 corresponds to the user data 220. The second image information 112 includes the user data 220.

That is to say, the data updating apparatus 120 may transmit the second image information 112 to the e-paper driving circuit 310 by, for example, wireless transmission. The disclosure does not limit the form of transmission of the second image information 112, in which the form of transmission may also be updating or transmitting information in a wired manner. The e-paper driving circuit 310 drives the e-paper display panel 320 to display the second image information 112.

To sum up, in the embodiment of the disclosure, the e-paper identification card system applies the characteristics of an e-paper to an e-paper identification card. The user as a visitor records the present image in the e-paper identification card system by a camera. Customized information such as the visitor's profile photo, visitor's name, visitor's company, and visiting unit may be displayed on the e-paper identification card by the e-paper display panel, which may quickly identify the identity of the visitor using the e-paper identification card, improve the traditional one-time use identification card that provides no personal information and causes identification difficulties, and may effectively reduce the risk of identity theft of an identification card.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. An e-paper identification card system, comprising:
   an e-paper identification card, configured to display first image information; and
   a data updating apparatus, electrically connected to the e-paper identification card,
   wherein the data updating apparatus comprises an image capturing device,
   wherein the e-paper identification card is updated to display second image information including a profile photo of a user by using the data updating apparatus to scan the first image information and using the image capturing device to take a photo of the user to capture the profile photo of the user;
   wherein the image capturing device is a camera.

2. The e-paper identification card system according to claim 1, wherein the image capturing device is configured to capture the first image information from the e-paper identification card.

3. The e-paper identification card system according to claim 2, wherein the data updating apparatus obtains user data from a database according to the first image information, and the second image information comprises the user data.

4. The e-paper identification card system according to claim 1, wherein the data updating apparatus comprises a user interface, configured to be operated to update display information of the e-paper identification card.

5. The e-paper identification card system according to claim 1, wherein the e-paper identification card comprises an e-paper driving circuit and an e-paper display panel, in which the data updating apparatus transmits the second image information to the e-paper driving circuit, and the e-paper driving circuit drives the e-paper display panel to display the second image information.

6. A method of using an e-paper identification card comprising an e-paper display panel, configured to display first image information corresponding to user data; and an e-paper driving circuit, electrically connected to the e-paper display panel, the method, comprising:
   receiving, by the e-paper driving circuit, second image information including both the user data and a profile photo of a user from a data updating apparatus;
   updating the e-paper display panel to display both the user data and the profile photo of the user by using the data updating apparatus to scan the first image information and using a camera of the data updating apparatus to take a photo of the user capture the profile photo of the user.

7. The method according to claim 6, wherein the e-paper driving circuit receives the second image information from a data updating apparatus, and the data updating apparatus is configured to capture the first image information from the e-paper display panel and to obtain the user data from a database according to the first image information.

\* \* \* \* \*